(12) United States Patent
Zhang et al.

(10) Patent No.: US 11,707,900 B2
(45) Date of Patent: Jul. 25, 2023

(54) TIRE MOLD

(71) Applicant: CHENG SHIN TIRE & RUBBER (CHINA) CO., LTD., Kunshan (CN)

(72) Inventors: Jun Zhang, Kunshan (CN); Hai Wang, Kunshan (CN); Xian-Sheng Yin, Kunshan (CN); Yang Lu, Kunshan (CN)

(73) Assignee: Cheng Shin Tire & Rubber (China) Co., Ltd., Kunshan (CN)

( * ) Notice: Subject to any disclaimer, the term of this patent is extended or adjusted under 35 U.S.C. 154(b) by 150 days.

(21) Appl. No.: 17/236,110

(22) Filed: Apr. 21, 2021

(65) Prior Publication Data

US 2021/0331435 A1 Oct. 28, 2021

(30) Foreign Application Priority Data

Apr. 24, 2020 (CN) .......................... 202010331669.4

(51) Int. Cl.
*B29D 30/06* (2006.01)
(52) U.S. Cl.
CPC ..... *B29D 30/0606* (2013.01); *B29D 30/0602* (2013.01); *B29D 2030/0612* (2013.01)
(58) Field of Classification Search
None
See application file for complete search history.

(56) References Cited

U.S. PATENT DOCUMENTS

| | | | |
|---|---|---|---|
| 5,145,688 A * | 9/1992 | Ohtake | B29C 43/36 425/28.1 |
| 6,461,134 B1 * | 10/2002 | Ito | B29D 30/0601 425/28.1 |
| 2016/0176135 A1 * | 6/2016 | Shintani | H05B 3/34 425/28.1 |
| 2018/0178467 A1 * | 6/2018 | Ando | B29D 30/0606 |

FOREIGN PATENT DOCUMENTS

| | | |
|---|---|---|
| CN | 101920567 A | 12/2010 |
| CN | 108340513 A | 7/2018 |

* cited by examiner

*Primary Examiner* — Jacob T Minskey
*Assistant Examiner* — Adrien J Bernard
(74) *Attorney, Agent, or Firm* — Rosenberg, Klein & Lee

(57) ABSTRACT

A tire mold for processing a green tire includes a movable block, an upper sidewall plate, and a lower sidewall plate. A curved surface corresponding to the green tire is provided at a junction of the movable block and the upper sidewall plate/the lower sidewall plate. The movable block, the upper sidewall plate and the lower sidewall plate cooperate with each other to surround a tire cavity for accommodating the green tire. Thereby, the edge of the upper sidewall plate or the lower sidewall plate won't penetrate the green tire to form a joint fin when the mold is closed, which is beneficial to save the rubber material, improves production efficiency and reduces manufacturing costs.

9 Claims, 6 Drawing Sheets

TIRE MOLD

FIELD OF THE INVENTION

The present invention relates to tire manufacturing equipment, and more particularly to a tire mold.

BACKGROUND OF THE INVENTION

Referring to FIG. 4 through FIG. 6, a conventional tire mold generally comprises a movable block 1', an upper sidewall plate 2' and a lower sidewall plate 3' to surround a tire cavity for placement of a green tire 4'. At the junction of the movable block 1' and the upper sidewall plate 2' and at the junction of the movable block 1' and the lower sidewall plate 3', since the edges of the upper sidewall plate 2' and the lower sidewall plate 3' are relatively sharp, the edges of the upper sidewall plate 2' and the lower sidewall plate 3' may penetrate the green tire 4' easily when the mold is closed for vulcanization, or, when the mold is closed, the contour of the mold may interfere with the outer contour of the green tire 4'. As a result, the mold grips the rubber material to form a joint fin 6' on a finished tire 5'.

In view of the problem that the tire 5' has the joint fin 6' after vulcanization, the mold is provided with a joint fin groove for quickly cutting the joint fin 6' subsequently. However, the joint fin 6' formed by the joint fin groove needs to be cut manually or mechanically, which causes problems such as wasting rubber material, delaying production progress, and increasing manufacturing costs.

SUMMARY OF THE INVENTION

In order to avoid the occurrence of a joint fin, the primary object of the present invention is to provide a tire mold for processing a green tire. The tire mold comprises a movable block, an upper sidewall plate, and a lower sidewall plate. The upper sidewall plate is coupled to the movable block. A curved surface corresponding to the green tire is provided at a junction of the movable block and the upper sidewall plate. The lower sidewall plate is coupled to the movable block. The curved surface corresponding to the green tire is also provided at a junction of the movable block and the lower sidewall plate. The movable block, the upper sidewall plate and the lower sidewall plate cooperate with each other to surround a tire cavity for accommodating the green tire.

Preferably, the curved surface has a radius between 0.5 mm and 4 mm.

Preferably, the movable block has a forming groove for accommodating the green tire. The ratio of a depth Hs of the forming groove along a radial direction of the tire cavity to a cross-sectional height H of the tire cavity is between 0.1 and 0.3.

Preferably, the tire mold further comprises a mold sleeve. The movable block is slidably connected to an inner wall of the mold sleeve. The movable block is moved away from a center axis of the tire cavity along the radial direction of the tire cavity along with an upward movement of the mold sleeve, and the movable block is moved to approach the center axis of the tire cavity along the radial direction of the tire cavity along with a downward movement of the mold sleeve.

Preferably, the tire mold further comprises an upper bearing plate that can be raised and lowered. The upper sidewall plate is disposed on the upper bearing plate.

Preferably, the mold sleeve is hung on the upper bearing plate.

Preferably, the tire mold further comprises a lower bearing plate. The lower sidewall plate is disposed on the lower bearing plate.

Preferably, a slide guide structure along the radial direction of the tire cavity is provided between the upper bearing plate and the movable block and/or between the lower bearing plate and the movable block.

Preferably, a limit guide structure is provided between the mold sleeve and the lower bearing plate.

Preferably, the movable block includes a slide block and a tread module. The tread module is detachably connected to the slide block.

According to the above technical features, the following effects can be achieved.

Because the curved surface corresponding to the green tire is provided at the junction of the movable block and the upper sidewall plate/the lower sidewall plat, the edge of the upper sidewall plate or the lower sidewall plate won't directly penetrate the green tire when the mold is closed. This reduces the chance of the joint fin after the tire is vulcanized, is beneficial to save the rubber material, improves production efficiency and reduces manufacturing costs.

DESCRIPTION OF THE PREFERRED EMBODIMENTS

Embodiments of the present invention will now be described, by way of example only, with reference to the accompanying drawings.

Figure 1:
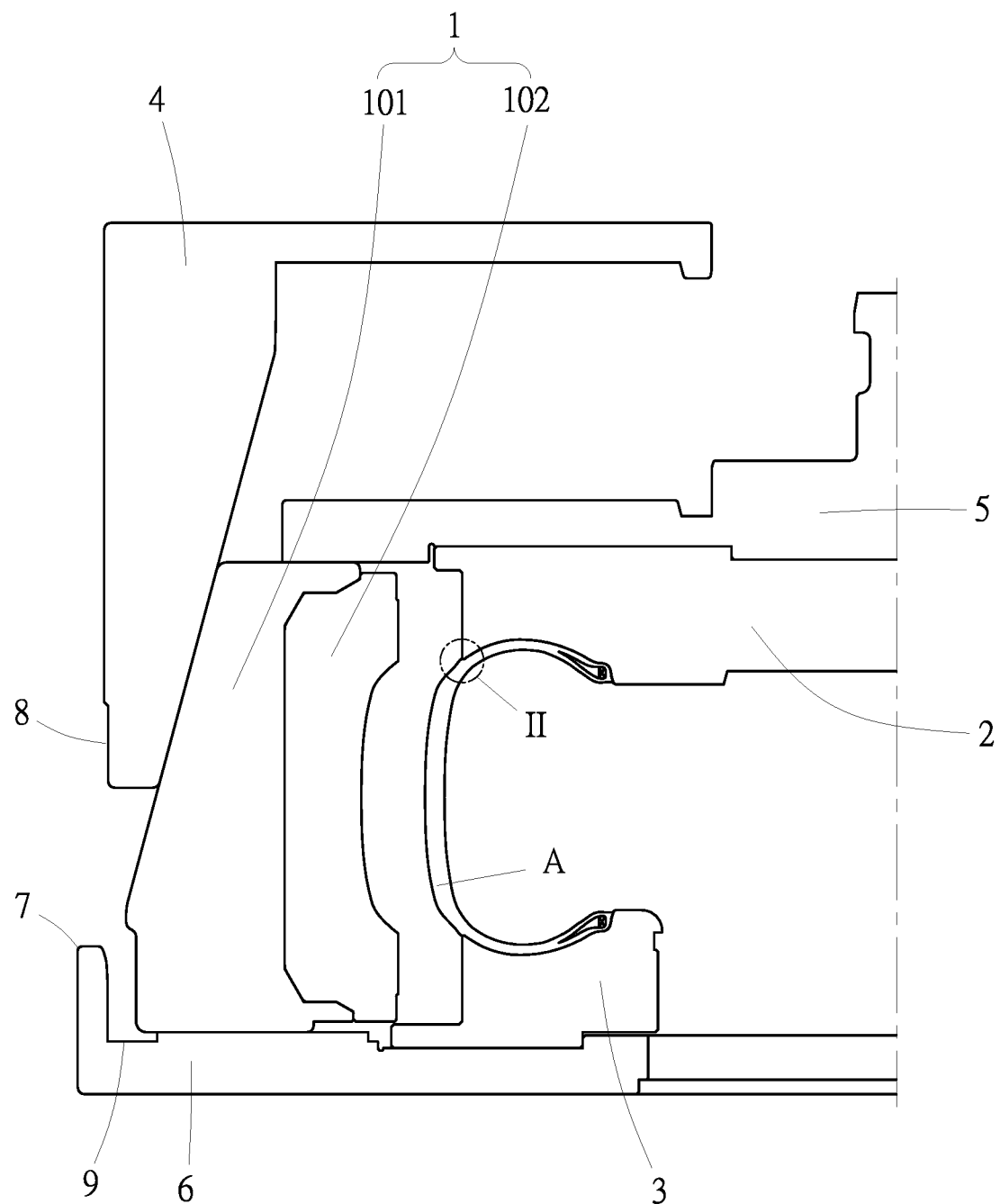
FIG. 1 is a first schematic view according to a preferred embodiment of the present invention.
Figure 2:
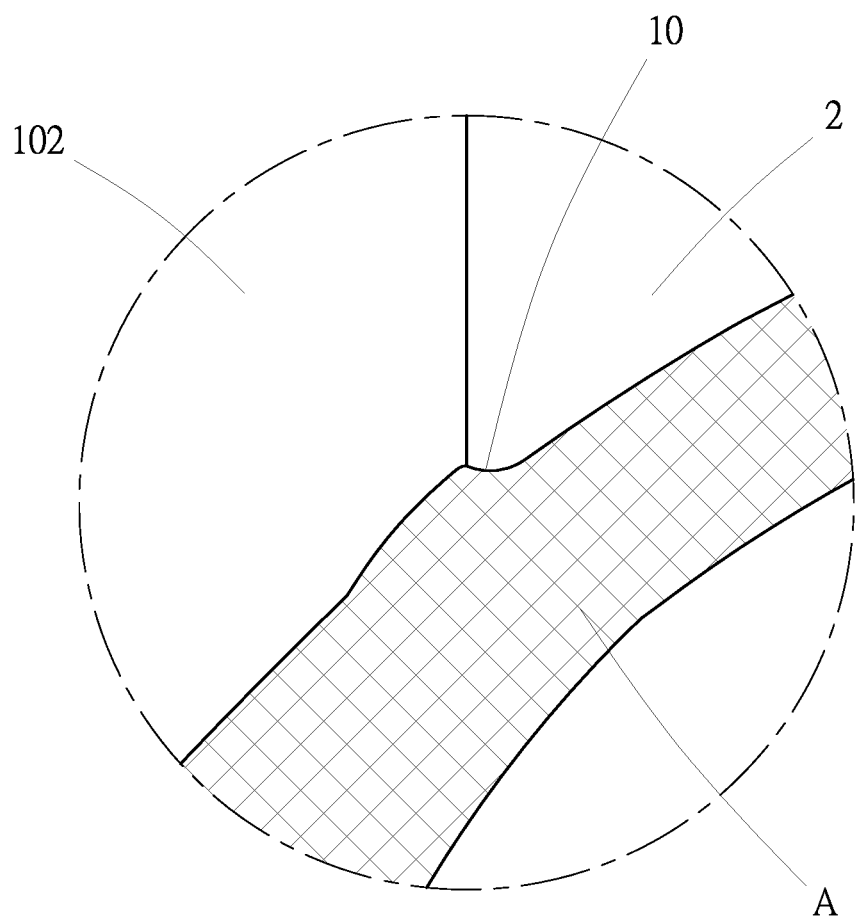
FIG. 2 is a partially enlarged view of FIG. 1.

Referring to the FIG. 1 and FIG. 2, a tire mold for processing a green tire A according to an embodiment of the present invention comprises a movable block 1, an upper sidewall plate 2, and a lower sidewall plate 3.

The movable block 1, the upper sidewall plate 2 and the lower sidewall plate 3 cooperate with each other to surround a tire cavity. A curved surface 10 corresponding to the green tire A is provided at the junction of the movable block 1 and the upper sidewall plate 2, that is, the acute-angled tip in contact with the green tire A. A curved surface 10 corresponding to the green tire A is also provided at the junction of the movable block 1 and the lower sidewall plate 3, that is, the acute-angled tip in contact with the green tire A. It should be noted that the movable block 1, the upper sidewall plate 2 and the lower sidewall plate 3 each may have the curved surface 10. In the drawings, the curved surface 10 is only illustrated on the upper sidewall plate 2 as an example.

Thereby, the edge of the upper sidewall plate 2 or the lower sidewall plate 3 won't directly penetrate the green tire A when the mold is closed. This reduces the chance of the joint fin after the tire is vulcanized, is beneficial to save the rubber material, improves production efficiency and reduces manufacturing costs.

Preferably, the radius of the curved surface 10 is between 0.5 mm and 4 mm.

Figure 3:
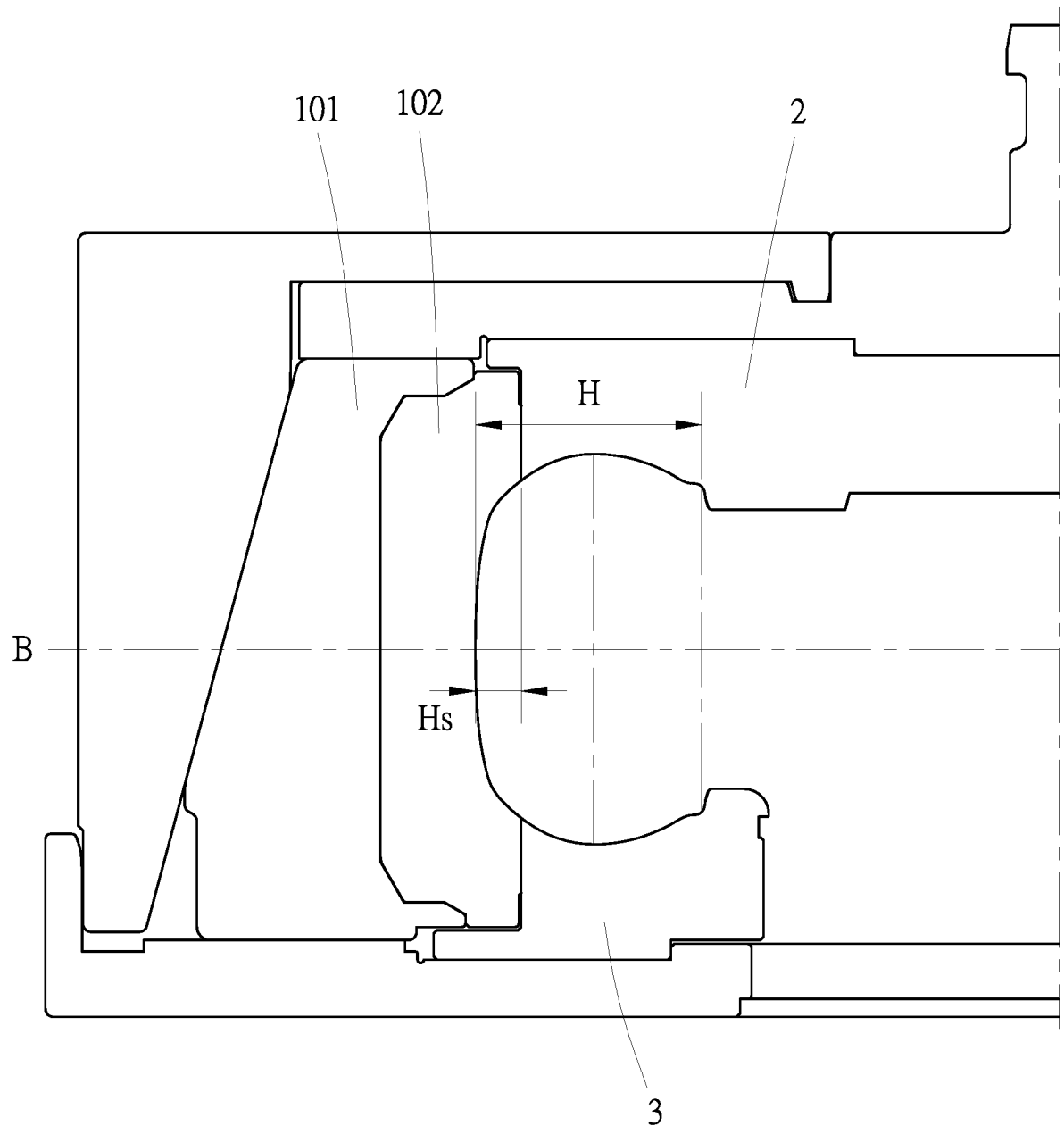
FIG. 3 is a second schematic view according to the preferred embodiment of the present invention, illustrating that the tire mold is closed.
Figure 4:
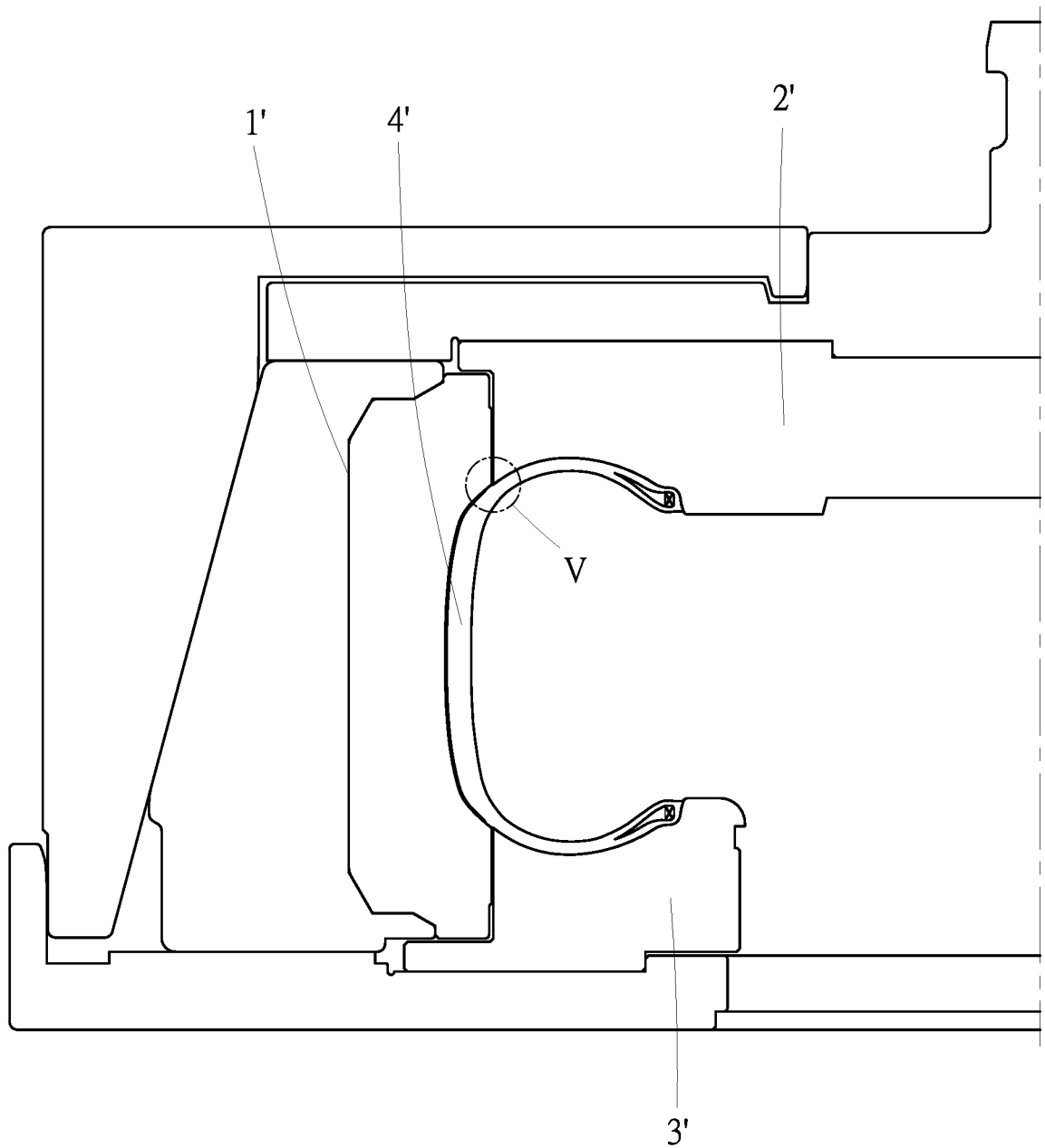
FIG. 4 is a schematic view of a conventional tire mold.
Figure 5:
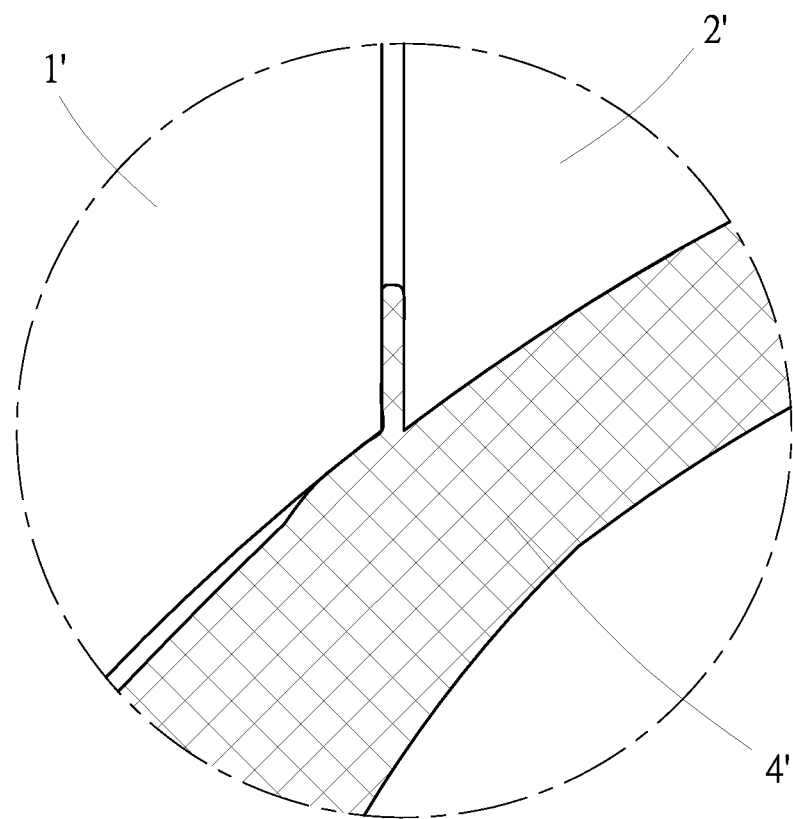
FIG. 5 is a partially enlarged view of FIG. 4.
Figure 6:
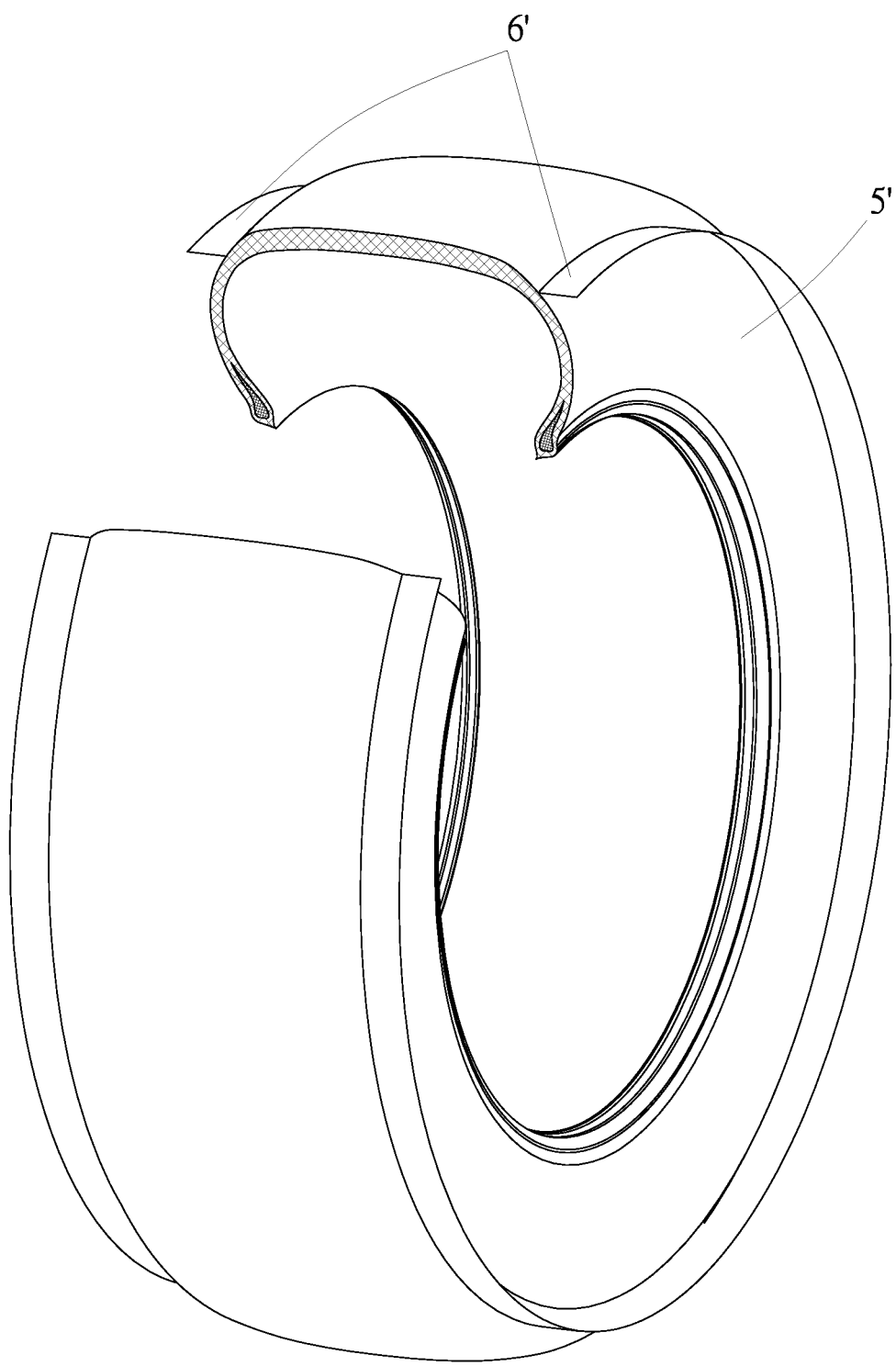
FIG. 6 is a schematic view of a tire structure manufactured by the conventional tire mold.

Referring to FIG. 1 through FIG. 3, preferably, the movable block 1 has a forming groove for accommodating the green tire A. The ratio of a depth Hs of the forming groove along the radial direction of the tire cavity to a cross-sectional height H of the tire cavity is between 0.1 and 0.3. By reducing the depth Hs of the forming groove of the movable block 1 along the radial direction of the tire cavity, the diameter point of the joint surface of the mold is increased when the mold is closed. That is, the contact point between the upper sidewall plate 2/the lower sidewall plate 3 and the green tire A is moved outward along the radial direction of the tire cavity, so that the edge of the upper sidewall plate 2/the lower sidewall plate 3 is in smooth contact with the contour of the green tire A. Correspondingly, with the same specification of the flatness ratio, the cross-sectional width of the tire increases, and the value of the depth Hs increases accordingly. With the same specification of the cross-sectional width of the tire, the flatness ratio increases, and the value of the depth Hs increases accordingly.

The tire mold further includes a mold sleeve 4. The movable block 1 is slidably connected to the inner wall of the mold sleeve 4. The inner wall of the mold sleeve 4 is an inclined surface, so that the movable block 1 is moved away from a center axis B of the tire cavity along the radial direction of the tire cavity along with the upward movement of the mold sleeve 4. The movable block 1 is moved to approach the center axis B of the tire cavity along the radial direction of the tire cavity along with the downward movement of the mold sleeve 4, so as to open and close the mold.

Furthermore, the tire mold further includes an upper bearing plate 5 that can be raised and lowered. The upper sidewall plate 2 is disposed on the upper bearing plate 5. When the mold is closed or opened, the upper bearing plate 5 and the mold sleeve 4 may be moved synchronously or independently.

Preferably, the mold sleeve 4 is hung on the upper bearing plate 5, so that the mold sleeve 4 can not only rise or fall synchronously with the upper bearing plate 5, but also rise or fall by itself.

The tire mold further includes a lower bearing plate 6. The lower sidewall plate 3 is disposed on the lower bearing plate 6.

For the mold to be closed and opened easily, in a preferred embodiment of the present invention, a slide guide structure along the radial direction of the tire cavity is provided between the upper bearing plate 5 and the movable block 1 and/or between the lower bearing plate 6 and the movable block 1. Specifically, the slide guide structure includes a slide block 101 and a slide groove (not shown) that cooperate with each other. The slide block 101 is arranged on one of the upper bearing plate 5 and the movable block 1, and the slide groove is arranged on the other of the upper bearing plate 5 and the movable block 1. The slide guide structure between the lower bearing plate 6 and the movable block 1 is arranged in the same manner as the slide guide structure between the upper bearing plate 5 and the movable block 1 described above.

In order to further optimize the above technical solution, a limit guide structure is provided between the mold sleeve 4 and the lower bearing plate 6. The limit guide structure includes a limit flange 7 extending upward from the edge of the lower bearing plate 6, a limit slide groove 8 arranged on the outer peripheral surface of the mold sleeve 4, and a limit groove 9 arranged on the lower bearing plate 6. In the process of closing the mold, the mold sleeve 4 is first in contact with the limit flange 7 on the lower bearing plate 6, and the limit flange 7 cooperates with the limit slide grove 8 to guide and position the mold sleeve 4. When the mold sleeve 4 is lowered to the final position of closing the mold, the lower end of the mold sleeve 4 cooperates with the limit groove 9, so that the mold sleeve 4 is limited in the radial direction and the circumferential direction to align with the movable block 1.

Preferably, the movable block 1 includes the slide block 101 and a tread module 102. The tread module 102 is detachably connected to the slide block 101. In this way, it is only necessary to replace the damaged tread module 102 without replacing the entire movable block 1, thereby saving maintenance costs.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A tire mold for processing a green tire, comprising:
   a movable block;
   an upper sidewall plate coupled to the movable block, and
   a lower sidewall plate coupled to the movable block,
      wherein a curved surface corresponding to the green tire is configured to extend at a junction of the movable block with the lower sidewall plate and at a junction of the movable block with the upper sidewall plate, the curved surface having a radius ranging between 0.5 mm and 4 mm;
   wherein the movable block, the upper sidewall plate and the lower sidewall plate cooperate with each other to define a tire cavity for accommodating the green tire, and wherein the curved surface forms a smooth transition between the movable block and the upper sidewall plate and between the movable block and the lower sidewall plate, thereby preventing a sharp-angled interference between edges of the upper and lower sidewall plates with the tire cavity.

2. The tire mold as claimed in claim 1, wherein the movable block has a forming groove for accommodating the green tire, and the ratio of a depth Hs of the forming groove along a radial direction of the tire cavity to a cross-sectional height H of the tire cavity is between 0.1 and 0.3.

3. The tire mold as claimed in claim 1, further comprising a mold sleeve, the movable block being slidably connected to an inner wall of the mold sleeve, wherein the movable block is moved away from a center axis of the tire cavity along a radial direction of the tire cavity along with an upward movement of the mold sleeve, and the movable block is moved to approach the center axis of the tire cavity along the radial direction of the tire cavity along with a downward movement of the mold sleeve.

4. The tire mold as claimed in claim 3, further comprising an upper bearing plate that can be raised and lowered, the upper sidewall plate being disposed on the upper bearing plate.

5. The tire mold as claimed in claim 4, wherein the mold sleeve is hung on the upper bearing plate.

6. The tire mold as claimed in claim 4, further comprising a lower bearing plate, the lower sidewall plate being disposed on the lower bearing plate.

7. The tire mold as claimed in claim 6, wherein a slide guide structure along the radial direction of the tire cavity is provided between the upper bearing plate and the movable block and/or between the lower bearing plate and the movable block.

8. The tire mold as claimed in claim 6, wherein a limit guide structure is provided between the mold sleeve and the lower bearing plate.

9. The tire mold as claimed in claim 1, wherein the movable block includes a slide block and a tread module, and the tread module is detachably connected to the slide block.

* * * * *